US 6,592,149 B2

(12) United States Patent
Sessoms (10) Patent No.: US 6,592,149 B2
(45) Date of Patent: Jul. 15, 2003

(54) POSITIONING DEVICES FOR VEHICLE OCCUPANT RESTRAINTS (76) Inventor: Paris E. Sessoms, 1112 Parkview Dr., Elizabeth City, NC (US) 27909

(*) Notice: Subject to any disclaimer, the term of this patent is extended or adjusted under 35 U.S.C. 154(b) by 142 days.

(21) Appl. No.: 09/929,005

(22) Filed: Aug. 15, 2001

(65) Prior Publication Data
US 2002/0063423 A1 May 30, 2002

Related U.S. Application Data
(60) Provisional application No. 60/253,100, filed on Nov. 28, 2000.

(51) Int. Cl.⁷ .............................. B60R 22/48; B68B 5/00
(52) U.S. Cl. ........................ 280/801.1; 24/168; 297/486
(58) Field of Search ................... 280/801.1; 24/163, 24/168, 170; 29/171; 297/483, 486

(56) References Cited

U.S. PATENT DOCUMENTS

| 3,912,035 | A | | 10/1975 | Ulert | |
|---|---|---|---|---|---|
| 4,371,192 | A | | 2/1983 | Alix | |
| 4,473,926 | A | * | 10/1984 | Ono | 24/196 |
| 4,549,769 | A | * | 10/1985 | Pilarski | 297/483 |
| 4,669,751 | A | | 6/1987 | Unger | |
| 4,726,625 | A | * | 2/1988 | Bougher | 297/483 |
| 4,747,617 | A | * | 5/1988 | Magyar et al. | 280/808 |
| 4,941,683 | A | | 7/1990 | Tabata et al. | |
| 4,974,876 | A | | 12/1990 | Svensson et al. | |
| 5,023,980 | A | * | 6/1991 | Thomas | 24/196 |
| 5,058,244 | A | * | 10/1991 | Fernandez | 24/170 |
| 5,160,167 | A | | 11/1992 | Fourrey et al. | |
| 5,165,719 | A | * | 11/1992 | Yano | 280/801.2 |
| 5,201,099 | A | | 4/1993 | Campbell | |
| 5,339,870 | A | * | 8/1994 | Green et al. | 140/123.5 |
| 5,355,913 | A | * | 10/1994 | Green et al. | 140/123.6 |
| 5,476,287 | A | | 12/1995 | Lichtwardt | |
| 5,579,561 | A | * | 12/1996 | Smith et al. | 24/170 |
| 5,692,806 | A | | 12/1997 | Jones | |
| 5,713,602 | A | | 2/1998 | Lee | |
| 5,749,601 | A | | 5/1998 | Knoll et al. | |
| 5,758,919 | A | * | 6/1998 | Matheis | 296/37.16 |
| 5,845,372 | A | * | 12/1998 | Smith et al. | 24/168 |
| 5,864,927 | A | * | 2/1999 | Liu | 24/163 R |
| 6,065,777 | A | | 5/2000 | Merrick | |
| 6,230,370 | B1 | * | 5/2001 | Nelsen | 24/68 CD |
| 6,247,208 | B1 | * | 6/2001 | Creech | 24/68 BT |
| 6,279,847 | B1 | * | 8/2001 | Berger | 242/388.1 |

FOREIGN PATENT DOCUMENTS

| EP | 22468 | 1/1981 |
|---|---|---|
| EP | 24812 | 3/1981 |
| EP | 307339 | 3/1989 |
| FR | 2613990 | 10/1988 |
| FR | 2682655 | 4/1993 |
| GB | 2064943 | 6/1981 |
| JP | 63-71453 | 3/1988 |
| WO | 88/01582 | 3/1988 |

* cited by examiner

Primary Examiner—Paul N. Dickson
Assistant Examiner—Toan To
(74) Attorney, Agent, or Firm—Richard C. Litman (57) ABSTRACT A system for positioning occupant restraints in a vehicle includes a pair of cooperative embodiments. A first embodiment comprises a clamp removably securable about an occupant restraint belt (preferably the shoulder strap, but the device may be applied to the lap belt, as well). The device includes a lateral slide bearing upon a pressure plate for applying clamping pressure to the belt. The clamp is particularly useful in securing to a shoulder harness, to preclude retraction of the strap through the "B" pillar guide for allowing some slack in the strap for occupant comfort. The second embodiment comprises two mating components hinged together at one end, with a series of mating slots therein. A shoulder harness slot and latch mechanism is provided opposite the hinge. The device is opened and secured about the support rods of an adjustable height headrest, with the shoulder strap passing through the shoulder strap guide.

19 Claims, 5 Drawing Sheets

POSITIONING DEVICES FOR VEHICLE OCCUPANT RESTRAINTS

CROSS-REFERENCE TO RELATED APPLICATION

This application claims the benefit of U.S. Provisional Patent Application Serial No. 60/253,100, filed Nov. 28, 2000.

BACKGROUND OF THE INVENTION

1. Field of the Invention

The present invention relates generally to vehicle occupant restraint systems, such as seat belts and shoulder harnesses, and more specifically to devices for adjusting the position and tension of such belts and harnesses, particularly the shoulder harness strap, as they pass across the seated vehicle occupant.

2. Description of Related Art

Increasing safety consciousness, as well as increasing vehicle speeds, have led to the development of various systems for protecting the operator and passengers of such vehicles. While occupant restraint systems were first developed for aircraft, their efficacy in ground vehicles (automobiles, etc.) was later recognized and required in automobiles, light trucks, and other road vehicles.

Restraining straps in some form (e.g., seat belts and shoulder harnesses) have been universally adapted as occupant restraints in ground vehicles, along with other passive protective systems ("air bags," etc.). However, the use of such restraints is far from universal, even though nearly every jurisdiction has enacted laws requiring their use by vehicle occupants.

Perhaps one of the major reasons behind this lack of use, is the discomfort experienced by many vehicle occupants due to the restraint belts and straps crossing their bodies. This factor has been considered in regulations relating to seat belt and shoulder harness installations in vehicles, but it appears impossible to develop a "one size fits all" restraint system for such vehicles, due to the wide variation in sizes and shapes of vehicle occupants.

As a result, the National Highway Transportation Safety Board (NHTSB) has adopted a standard requiring restraint systems to be developed around the 50th percentile male body. The greater the difference between the vehicle occupant and this 50th percentile male standard, the less likely the restraints are to fit the occupant comfortably. This is particularly true with women, and particularly smaller women, and the path of the shoulder harness generally diagonally across their chests. The interference of the shoulder harness strap with the breast most nearly adjacent the high attach point of the strap, has been noted for years by many women. While various devices and techniques have been sought over the years to alleviate the problem of poorly fitting belts for both men and women, the problem still exists for many vehicle occupants.

Accordingly, a need will be seen for means for repositioning the conventional occupant restraint belts or straps in a motor vehicle, in order to provide greater occupant comfort. The present invention responds to this need with two related embodiments. In the first embodiment, a clamp is releasably attachable to the restraint strap (e.g., shoulder harness) and is adjusted to bear against the conventional "B" pillar anchor point for such shoulder restraints, thereby preventing the strap from retracting further onto its conventional retraction reel and providing some slack in the strap as desired by the occupant.

The second embodiment comprises an adjustably positionable bar which secures adjustably to the headrest support columns of a vertically adjustable headrest. The bar extends toward the outside wall of the vehicle, and provides a slot through which the shoulder harness strap passes. The two embodiments of the present invention may be used together with one another, or separately as desired. The embodiments of the present invention do not form any permanent part of the vehicle structure, but secure only to a shoulder harness (or seat belt) strap, or to the headrest support columns, as appropriate, and are quickly and easily installed and removed as desired.

A discussion of the related art of which the present inventor is aware, and its differences and distinctions from the present invention, is provided below.

U.S. Pat. No. 3,912,035 issued on Oct. 14, 1975 to Izaak A. Ulert, titled "Belt Relaxer," describes a complex electromechanical system which is permanently installed in the vehicle. The Ulert system requires a sensor in the lap belt and gearing to drive the belt retractor reel in a belt extending direction to provide the desired slack. Ulert also requires sensors in the seat to detect the weight of the occupant therein. In contrast, the present system is not a permanent part of the vehicle, does not require complex electromechanical or other mechanisms, and is easily installed and removed by the vehicle occupants in a few seconds.

U.S. Pat. No. 4,371,192 issued on Feb. 1, 1983 to Maurice A. J. Alix, titled "Tension Stop For Safety Belt Of The Inertia Reel Type," describes various embodiments of a device which secures around the belt and locks in place, to prevent undesired retraction of the belt. However, the Alix device operates differently than the present invention, in that the locking means operates in a longitudinal direction, i.e., in the direction of the length of the belt, in one embodiment, and rotationally in the other embodiment. Each embodiment requires two hands for tightening and releasing, in that the longitudinal actuation would merely pull the belt out or jam against the restraint, unless the body of the clamp were held by the other hand, and the rotational actuation would require that the body of the device be held to preclude twisting the belt during actuation. In contrast, the present clamp uses lateral actuation, permitting the device to be gripped and actuated using only a single hand. It is also noted that the belt locking contact portions of the Alix devices contact the belt directly, rather than bearing against a secondary plate which in turn grips the belt, as in the present invention. This direct gripping of the belt by a component which slides or rotates, results in the belt material being urged in the same direction during actuation, thus twisting or shifting the belt out of the desired position when using the Alix device. Moreover, Alix requires that his clamping devices be disassembled for installation to and removal from the belt, with the body and locking portions comprising two separable components. The present invention comprises a clamp with a hinge along one edge and a pressure actuated latch along the other, permitting the device to be secured around the belt or strap using only one hand.

U.S. Pat. No. 4,669,751 issued on Jun. 2, 1987 to Hans Unger, titled "Tension Eliminator For A Vehicle Safety Belt Retractor," describes a complex mechanical retraction system which alternately locks the belt in position at a preset point or allows it to retract, with each pull on the belt. The Unger device is a permanently installed component in the vehicle, and is more closely related to the device of the '035 U.S. patent to Ulert, discussed further above, than to the present invention.

U.S. Pat. No. 4,941,683 issued on Jul. 17, 1990 to Hiroshi Tabata et al., titled "Vehicle Seat Belt Tightening System,"

describes a complex, explosively activated mechanism for tightening a seat belt in the event of a collision. The Tabata et al. device is a permanently installed component in the motor vehicle, and is incorporated with the conventional belt retraction reel of the vehicle. The Tabata et al. device is thus more closely related to the devices of the '035 U.S. patent to Ulert and '751 U.S. patent to Unger, both discussed further above, than to the present invention.

U.S. Pat. No. 4,974,876 issued on Dec. 4, 1990 to Gosta P. A. Svensson et al., titled "Seat Belt Retractor," describes various embodiments of a shoulder harness height adjusting device, generally comprising a spool permanently mounted to the "B" pillar of a motor vehicle. In some embodiments, a housing covers the spool with a slide installed in a slot in the housing. The shoulder harness passes through the slide, which adjusts upwardly and downwardly in the housing slot to position the height of the strap. The Svensson et al. device cannot be removably secured to the headrest supports of a vehicle occupant seat, as can the shoulder harness position adjuster of the present invention.

U.S. Pat. No. 5,160,167 issued on Nov. 3, 1992 to Francois Fourrey et al., titled "Self-Locking Strap Guide For A Seat Belt," describes a shoulder harness strap guide which is permanently attached to the "B" pillar of the automobile. The device includes a lockup feature, to preclude extension of the shoulder strap from the point of the guide in the event of a collision. This allows the conventional retractor to be constructed of lighter materials, as it would not be required to absorb the tension applied to the strap in the event of a collision. However, the Fourrey et al. device functions oppositely to the present invention, acting to lock the strap on extension of the strap, rather than locking the strap in a position to preclude retraction, as in the case of the present invention. Moreover, the Fourrey et al. device is permanently bolted to the "B" pillar of the vehicle, rather than merely securing about the shoulder strap, as in the case of the present invention.

U.S. Pat. No. 5,201,099 issued on Apr. 13, 1993 to Terry; A. Campbell, titled "Seat Belt Adjuster," describes a device which clamps to a seat belt and engages another portion of the belt above the buckle where the seat belt and shoulder harness portions of the belt conventionally join. The Campbell device enables the user to secure the device to the lap belt portion in a position as desired, and hook the shoulder harness thereto to adjust the point where the shoulder harness and lap belt join. However, the Campbell device does nothing to relocate the upper end of the shoulder harness strap where it passes the upper portion of the seat back, as is provided by one of the embodiments of the present invention. Moreover, the Campbell device cannot be adjustably repositioned along the length of a belt, once it is secured thereto. Rather, it must be opened and removed from its clamping position on the belt, for relocation. In contrast, the present belt attachment remains on the belt or shoulder strap and is easily slid along the belt or strap for repositioning as desired, without removing the device from the strap.

U.S. Pat. No. 5,476,287 issued on Dec. 19, 1995 to john R. Lichtwardt, titled "Method And System For Controlling The Position Of A Seat Belt Relative To An Occupant Of A Vehicle," describes an electromechanical device permanently attached to the vehicle structure, unlike the slack retaining embodiment of the present invention. The Lichtwardt device has a pair of opposed fingers which grip the shoulder strap according to commands from an electric motor. In contrast, the present slack adjuster device (1) does not attach to the structure of the vehicle, but grips only the shoulder strap and bears against a shoulder strap guide in the vehicle, in order to provide the desired slack, and (2) is purely mechanical, containing no electrical or other powered means.

U.S. Pat. No. 5,692,806 issued on Dec. 2, 1997 to Marc C. Jones, titled "Slip-On Seat Belt Tension Clip," describes a device somewhat resembling an older, single piece clothespin or the like. The device has a pair of arms defining a central slot, with each arm having one or more mating, longitudinally oriented internal corrugations to provide grip upon the belt. The device is applied laterally to the belt adjacent the guide loop for the belt, and precludes excessive retraction of the belt through the guide loop. However, the Jones device must be removed from the belt each time longitudinal adjustment along the belt is desired, and it also requires two hands for operation (one to hold the belt, and the other to apply the device to the belt). In contrast, the present device may be applied and adjusted along the belt by using one hand, and need not be removed for positional adjustment.

U.S. Pat. No. 5,713,602 issued on Feb. 3, 1998 to Joo-Hun Lee, titled "Seat Belt For A Vehicle," describes a permanently installed system which is integral with the vehicle structure, unlike the devices of the present invention. The Lee device comprises a longitudinally adjustable shoulder strap attachment point located just above the upper rear corner of the front door of the vehicle, to which the shoulder harness may attach. The attachment position may be adjusted forwardly or rearwardly over a limited range, in order to relieve belt pressure on the shoulder of a vehicle occupant as desired. The Lee assembly cannot be removed for transfer from one vehicle to another, as is the case with the present invention.

U.S. Pat. No. 5,749,601 issued on May 12, 1998 to Heinz Knoll et al., titled "Belt Force Limiter For A Vehicle Seat Belt," describes a relatively short arm which is permanently attached to the vehicle structure, and which carries the shoulder harness strap at the distal end thereof. The arm is attached to the vehicle structure by an energy absorbing component which may bend to allow the arm to flex forwardly in the event of a collision and large forces being applied to the shoulder strap. The Knoll et al. device differs from the present invention in that (1) it does not capture the shoulder harness to prevent excessive retraction and provide some slack, but rather alters the angle of the strap over the occupant's shoulder; and (2) the Knoll et al. device must be permanently attached to the vehicle structure, due to its energy absorbing function.

U.S. Pat. No. 6,065,777 issued to David D. Merrick on May 23, 2000, titled "Clamp For Retractor Belt," describes a system having a track which is permanently installed in the vehicle along the lower portion of the "B" pillar, above the belt retraction reel. A shoulder strap clamp secures around the shoulder strap adjacent to the track, and is adjustably attached to the track. The clamp may be locked in place along the track in order to preclude excessive retraction of the belt or strap onto the shoulder harness reel. The Merrick device cannot be removed from the vehicle, as can the present belt tension adjuster, and moreover provides the slack adjustment at a completely different point along the belt or strap, i.e., just above the retraction reel, rather than just in front of and below the upper retaining anchor, as provided by the present invention.

European Patent Publication No. 022,468 published on Jan. 21, 1981 to Allied Corporation, titled "Continuous-Loop Seat Belt System With Locking Junction Ring," describes a device which secures to the junction of the lap belt and shoulder strap portions of a door mounted belt tensioner system, i.e., "moving mouse" belt system. The device allows movement of the door mounted portion of the belt therethrough so long as no significant tension is applied to the belt system, but locks the position of the door mounted belt when tension is applied, e.g., upon sudden deceleration. This device is thus opposite the present positioning devices, which are not activated by decelerative forces and which restrict retraction of the shoulder belt, rather than extension.

European Patent Publication No. 024,812 published on Mar. 11, 1981 to Fuji Kiko Kabushiki Kaisha, titled "Seat Belt Locking Device For An Automobile Vehicle," describes a device defining a sinusoidal path for the belt, with a pair of wedge clamps on each side of a roller. When tension is applied to the belt, as in the event of sudden deceleration or collision, the force on the belt pulls the wedges against the roller, jamming the belt in position to preclude further extension. Grip on the belt is released as soon as tension is released on the belt. The device must be permanently installed in the vehicle in order to be operable, and cannot maintain a preselected belt position to provide a certain amount of slack in the belt, as provided by the present invention.

British Patent Publication No. 2,064,943 published on Jun. 24, 1981 to REPA Feinstanzwerk GmbH, titled "A Belt Feed Control Device," describes a device closely related to other conventional inertia locking reel systems. The device includes a locking mechanism to lock extension of the belt upon sudden deceleration or impact, and is permanently affixed to the structure of the motor vehicle. This is essentially opposite the present system, which does not restrict extension of the belt, but rather restricts retraction to provide some slack in the shoulder belt for the occupant's comfort. Also, as noted above, the present invention does not permanently attach within the vehicle structure.

PCT Patent Publication No. WO 88/01582 published on Mar. 10, 1988 to Britax-Kolb GMBH & Co., titled "Pivoting Clamp," describes (according to the English Abstract) a belt gripping clamp which develops some longitudinal movement during the closure movement against the belt, so as to essentially equalize the velocity of the clamp teeth and belt to reduce strain on the belt. The device must be anchored permanently to the vehicle structure in order to be operable, and serves to restrict extension of the belt. The present invention works in the opposite manner, as a removable belt accessory which restricts belt retraction, rather than extension.

Japanese Patent Publication No. 63-071,453 published on Mar. 31, 1988 to Fujii Akisumi illustrates a seat belt retainer bearing a closer resemblance to the devices of the Campbell '099 and Jones '806 U.S. patents, discussed further above, than to the present invention. The device of the '453 Japanese Patent Publication comprises a gripping member of unitary construction, with opposite sides defining a belt gripping passage therebetween. The open ends of the two sides may be clipped together by cooperating integrally formed clip members, to secure the device around the belt. The clip appears to require two hands for operation, unlike the single handed operation provided by the present invention, at least for opening the device. Moreover, the device of the '453 Japanese Patent Publication must be opened and removed from the belt and then reattached to the belt in order to adjust its position on the belt, unlike the present invention which may be released from its position on the belt and slid along the belt to a new position French Patent Publication No. 2,613,990 published on Oct. 21, 1988 to Joseph Garguir describes (according to the English Abstract) two separate components, one of which serves to lock the shoulder strap as desired. The shoulder strap locking mechanism is enclosed in a box which is in turn bolted or otherwise permanently attached to the vehicle structure. The device is manually lockable, but appears to lock the belt immovably in either direction of travel therethrough, thus restricting movement in both the extension and retraction directions, unlike the present invention.

European Patent Publication No. 307,339 published on Mar. 15, 1989 to Jean C. Martin describes (according to the English Abstract) a belt and retainer system, both specially configured for operation together. The retainer bracket is permanently affixed to the vehicle structure, with the belt passing through a slot therein. The belt includes a series of selectively retractable buttons therealong, with an extended button being unable to pass through the slot of the retainer bracket and thus precluding retraction of the belt. Belt retraction is enabled by pushing the extended button downwardly to lie substantially flush with the surface of the belt. In contrast, the present invention does not require a specially adapted or modified belt, and does not attach permanently to the vehicle structure.

Finally, French Patent Publication No. 2,682,655 published on Apr. 23, 1993 to Felix Ruiz describes (according to the English Abstract) a wedge which may be driven into the slot of the upper shoulder harness guide, which is in turn permanently secured to the vehicle structure. The wedge may be formed along one side of a flat sleeve which is installed about the belt, in order to retain the wedge along the belt. However, no means is apparent for adjusting the position of the wedge sleeve along the belt, nor for removing the sleeve from the belt. One of the drawbacks of many of the devices of the prior art is their permanent installation to the belt retraction system or vehicle structure, and this lack of removability of the '655 French Publication device provides further distinction between it and the present invention.

None of the above inventions and patents, taken either singly or in combination, is seen to describe the instant invention as claimed.

SUMMARY OF THE INVENTION

The present invention comprises different embodiments of means for adjusting the positioning of safety retaining straps or belts in motor vehicles, particularly for adjusting the slack and upper location of a shoulder harness or strap. The first embodiment comprises a clamp which is removably attachable to an occupant restraining belt (i.e., shoulder harness strap, or alternatively to the lap belt portion, if so desired) which forms a restriction to belt retraction through the conventional harness guide loop.

This device may be clamped to the shoulder harness at any position desired therealong, and serves to prevent the shoulder strap from retracting completely and thereby applying uncomfortable pressure across the shoulder and/or chest of the occupant. The device easily secured to and removed from the belt or strap as desired, generally requiring only one hand for operation. The locking means for the device comprises a laterally disposed slide which bears against a wedge within the housing of the device, with the lateral action of the locking means also providing for single handed operation if so desired, without twisting the belt or requiring additional support thereof.

The second embodiment provides additional means for positioning the shoulder harness as desired, for adjusting its position relative to the shoulder of the occupant. The position adjusting device essentially comprises an elongate clamp having two mating components hinged together at one end, with a series of mating slots therein. A shoulder harness slot and latch mechanism is provided opposite the hinge end. The device is opened and secured about the support rods or columns of an adjustable height headrest, with the shoulder strap being passed through the shoulder strap guide portion. The series of headrest support attachment slots allows the device to be placed at any one of a series of lateral positions relative to the headrest, thereby adjusting the lateral position of the shoulder harness guide and shoulder harness passing therethrough as desired. The two devices may be used in combination with one another, if so desired.

Accordingly, it is a principal object of the invention to provide various embodiments of positioning devices for vehicle occupant restraints, for preventing undue retraction of a belt against the body of an occupant of the vehicle to provide greater comfort for the occupant, and also for adjustably positioning the shoulder harness relative to the neck and upper body of the occupant as desired by the occupant for comfort.

It is another object of the invention to provide a belt retraction restraint comprising a clamp which is removably attachable to a belt as desired, with a laterally actuated wedge providing selective clamping pressure against a pressure plate within the device, which grips the belt passing through the device.

It is a further object of the invention to provide a shoulder harness positioning guide which is removably attachable to the support structure of an adjustable headrest in a vehicle occupant seat, for adjustably positioning the upper portion of a shoulder harness relative to the upper portion of the seat and upper body of the occupant.

Still another object of the invention is to provide a system for adjustably positioning the shoulder harness of a vehicle occupant restraint system, providing a predetermined amount of slack in the shoulder harness as desired by the occupant and further positioning the upper portion of the shoulder harness as desired by the occupant for the comfort of the occupant, with the system comprising a restraint belt clamp and a shoulder harness positioning guide in combination.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises two embodiments of a device, or collectively a system, for positioning the safety restraining straps or belts for an occupant in a motor vehicle. The present invention allows the occupant(s) of the vehicle to adjust the belt(s) to provide some amount of slack therein, so the belt(s) do not bear against the body/bodies of the occupant(s) due to the belt retraction forces applied from a conventional belt retraction reel. While the present devices or system is particularly adapted for use with a conventional shoulder strap or belt, one embodiment may be used with a lap belt as well, if so desired.

Figure 1:
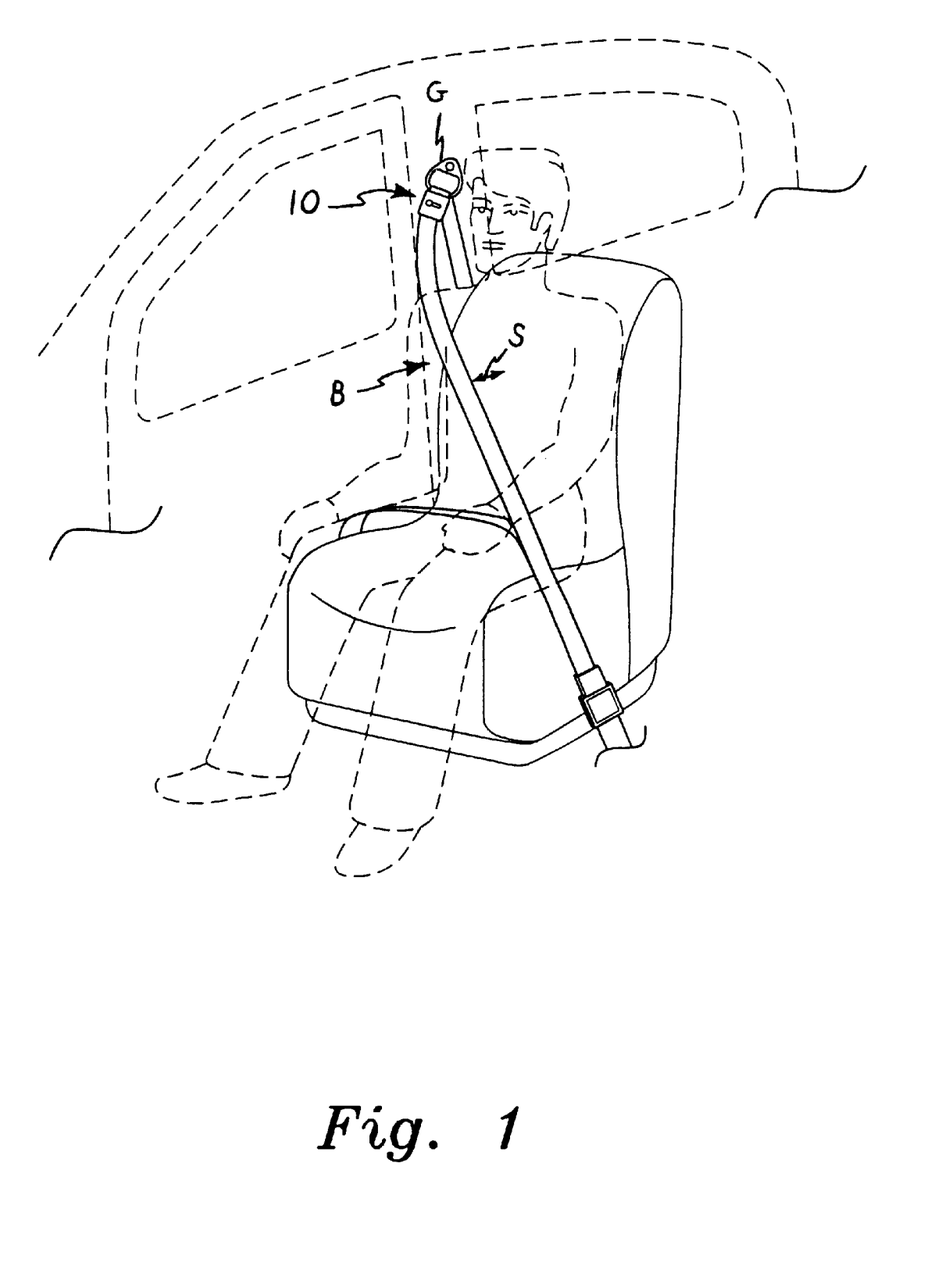
FIG. 1 is an environmental perspective view of a first embodiment of the present invention, comprising a restraining belt clamp for adjusting belt pressure on an occupant of a vehicle.
Figure 2:
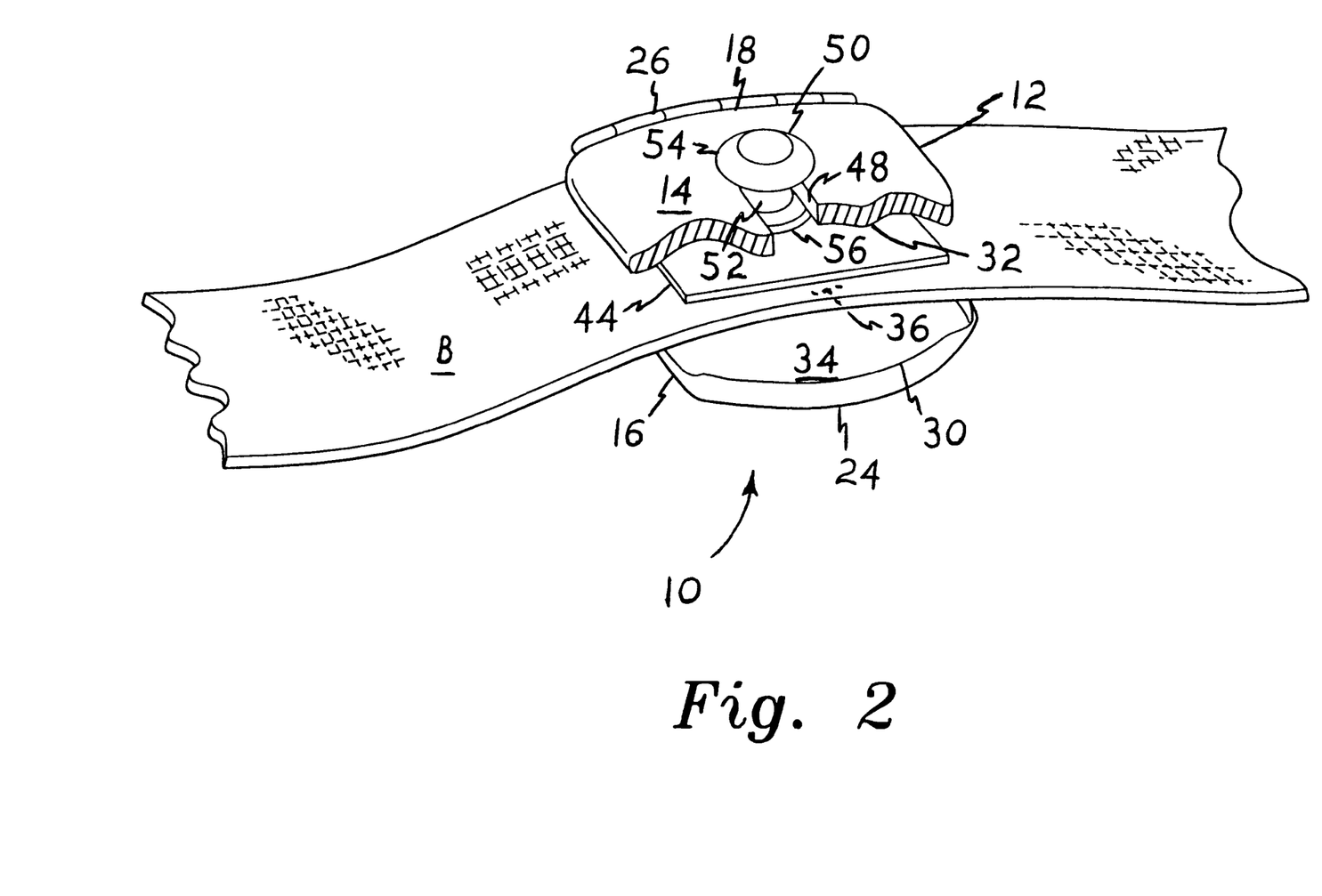
FIG. 2 is a perspective view in partial section of the belt clamp embodiment of FIG. 1 installed upon a length of belt, showing further details thereof.
Figure 3:
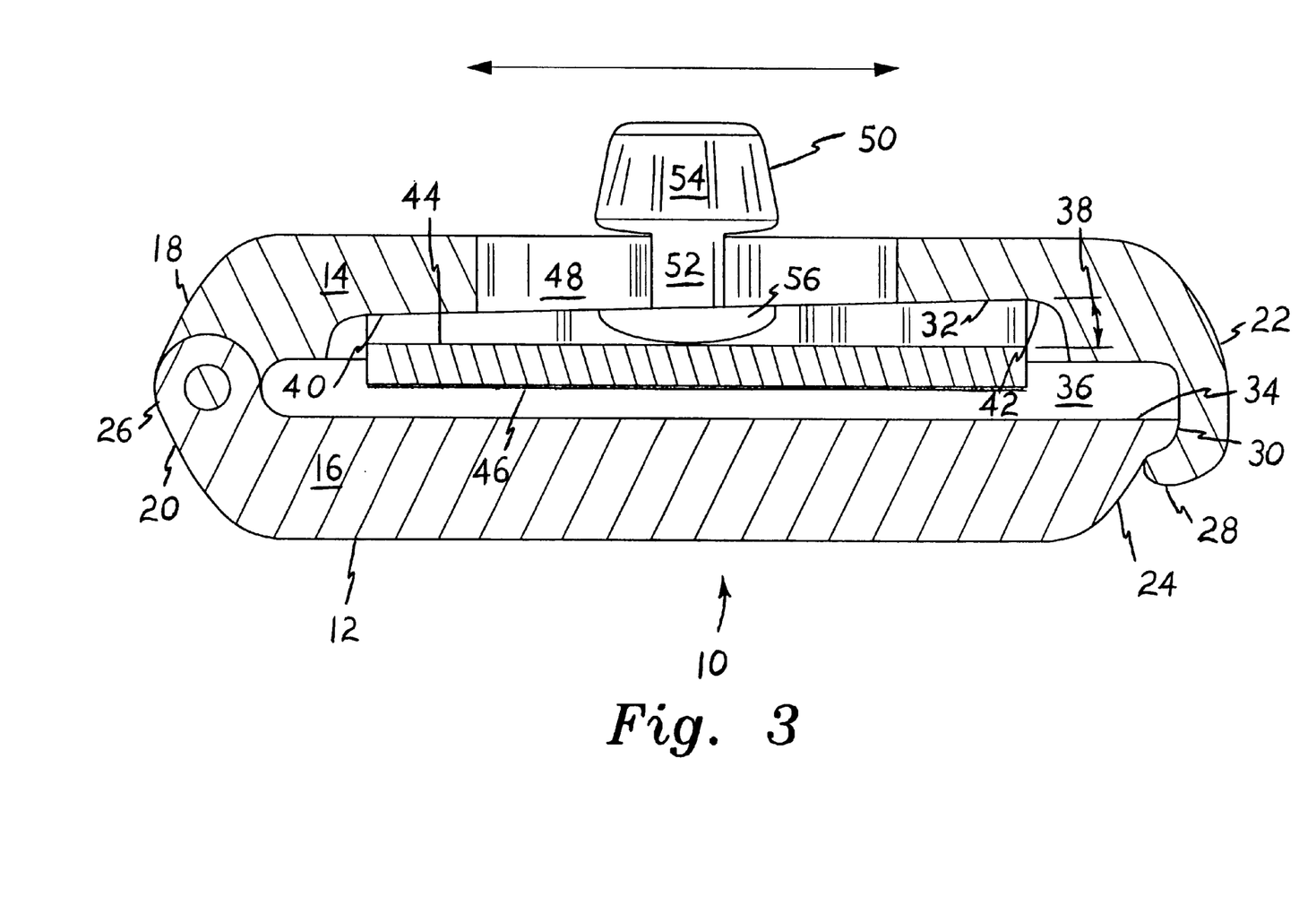
FIG. 3 is a lateral cross sectional view of the clamp of FIGS. 1 and 2, illustrating the principle of operation thereof.

FIGS. 1 through 3 illustrate a first embodiment of the present invention, comprising a generally square belt clamp 10 for removably securing to a safety belt B or strap in order to prevent excessive retraction of the belt B due to the retractile forces applied by the belt reel. The edges and corners of the device are preferably rounded, in order to avoid any chance of injury to a person using the device. In FIG. 1, the clamp 10 has been secured to a conventional shoulder belt B at a convenient position, where it bears against the conventional shoulder strap or harness guide G installed in the area of the "B" pillar of the vehicle. As the size of the clamp 10 is much too large to pass through the shoulder strap guide G, the clamp 10 and the remainder of the belt B to which it is attached, are prevented from passing through the guide G, thus providing a predetermined amount of slack S between the shoulder belt B and the occupant of the vehicle.

FIGS. 2 and 3 illustrate various details of the strap or belt clamp 10. The clamp 10 essentially comprises a housing 12, which is in turn formed of opposite but mating first and second sides 14 and 16. These two sides 14 and 16 are selectively openable by the vehicle occupant for securing about the belt or strap B as desired, generally as shown in FIG. 1. Each side 14 and 16 has a first edge, respectively 18 and 20, and an opposite second edge, respectively 22 and 24. The first edges 18 and 20 are connected together by means of a hinge 26, which secures the two sides 14 and 16 of the housing assembly 12 together.

The opposite second edges 22 and 24 include clasp means for securing the two second edges 22, 24 together to close the housing 12 about a belt B or strap, e.g., an inwardly turned extension 28 protruding from the second edge 22 of the first side 14 and a mating lip 30 extending outwardly from the second edge 24 of the second side 16 of the housing assembly 12. The inward extension 28 captures the lip 30 to secure the two side components 14 and 16 together, as desired. Preferably, at least the two side components 14 and 16 are formed of a flexible plastic material, so the occupant or user of the device 10 may easily flex the sides 14 and 16 relative to one another in order to engage and disengage the clasp members 28 and 30 as desired.

Each of the two sides 14 and 16 of the clamp 10 has an inner surface, respectively 32 and 34, which face one another to define a restraint strap or belt passage 36 therebetween when the sides 14 and 16 are closed. The first inner surface 32 has a lateral slope 38, with the first end 40 of the inner surface slope 38 being closer to the opposite second inner surface 34 than the second end 42 of the slope 38. In other words, this slope 38 widens or provides a larger gap between the two inner surfaces 32 and 34 near the clasp edges 22 and 24 of the two sides 14 and 16, than at the end near the hinge 26. This slope 38 may be reversed if desired, but the widening of the slope 38 toward the clasp edges 22 and 24 allows the user to release the grip control (discussed further below) more easily and naturally toward the opening edges 22 and 24 of the device.

A gripping plate 44 is installed within the sloped first inner surface 32, for bearing against and gripping the restraint belt B as it passes through the belt clamp device 10. The belt grip plate 44 may be restrained within the first side 14 of the housing assembly 12 by fingers or other conventional means (not shown) which extend from the inner surface 32 of the first side 14. The gripping plate 44 may include a belt or strap contact or grip surface 46 having a high coefficient of friction, e.g., coated with a rubberized type compound, leather, etc. as desired, to increase the gripping efficiency of the device, if so desired.

The first side 14 includes a laterally disposed slot 48 therethrough and extending generally from the first end 40 to the opposite second end 42 of the sloped inner surface 32. A slide control 50 is captured within this slot 48, and is adjusted laterally within the slot 48 to apply pressure selectively to the underlying belt gripping plate 44. The slide control 50 has a shank 52 with a width or diameter closely fitting within the width of the slot 48, thus allowing the control 50 to be slid laterally along the slot 48 as desired. The outer end of the control 50 includes a relatively large button 54 thereon, serving as a manipulator for the user. The opposite inner end of the control 50 terminates in a plate contact bearing 56 riding along the sloped first side inner surface 32, which bears against the surface of the belt gripping plate 44 opposite the belt contact surface 46.

As the slide control 50 is moved along the slot 48 from the thinner second end 42 toward the thicker first end 40, it will be seen that the contact bearing 56 of the control button 50 will be forced to descend toward the opposite second inner surface 34 of the housing 12, due to the slope 38. This results in the contact bearing pushing the strap or belt gripping plate 44 closer to the second inner surface 34 as well, thus narrowing the gap between the plate 44 and the second inner surface 34 to grip a belt or strap S more tightly therein. Sliding the control button 50 in the opposite direction releases this pressure on the plate 44 to allow the clamp 10 to be slid along the strap or belt B to a new location and retightened as desired.

Figure 4:
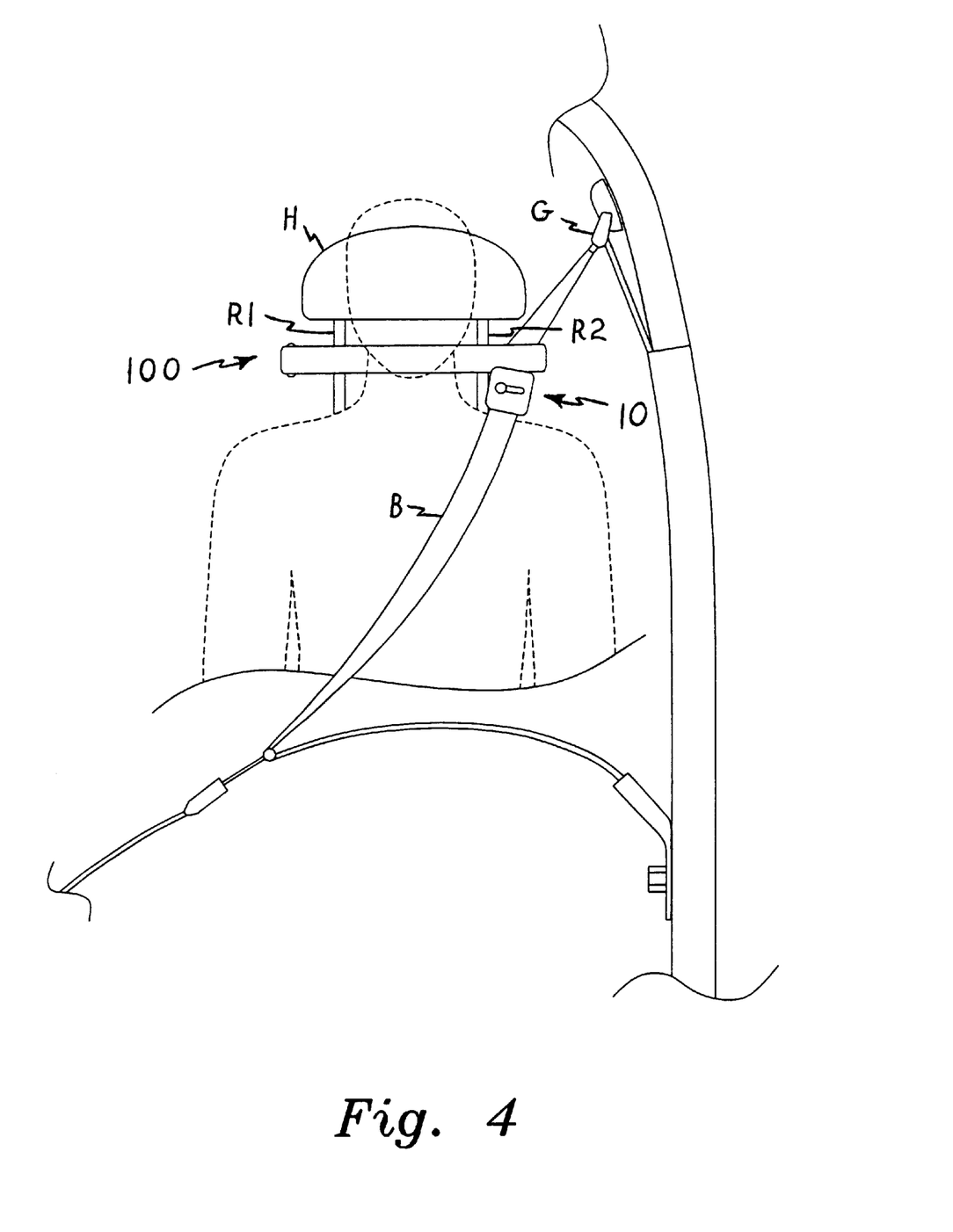
FIG. 4 is an environmental perspective view of the first and second embodiments of the present invention installed in combination in a motor vehicle.
Figure 5:
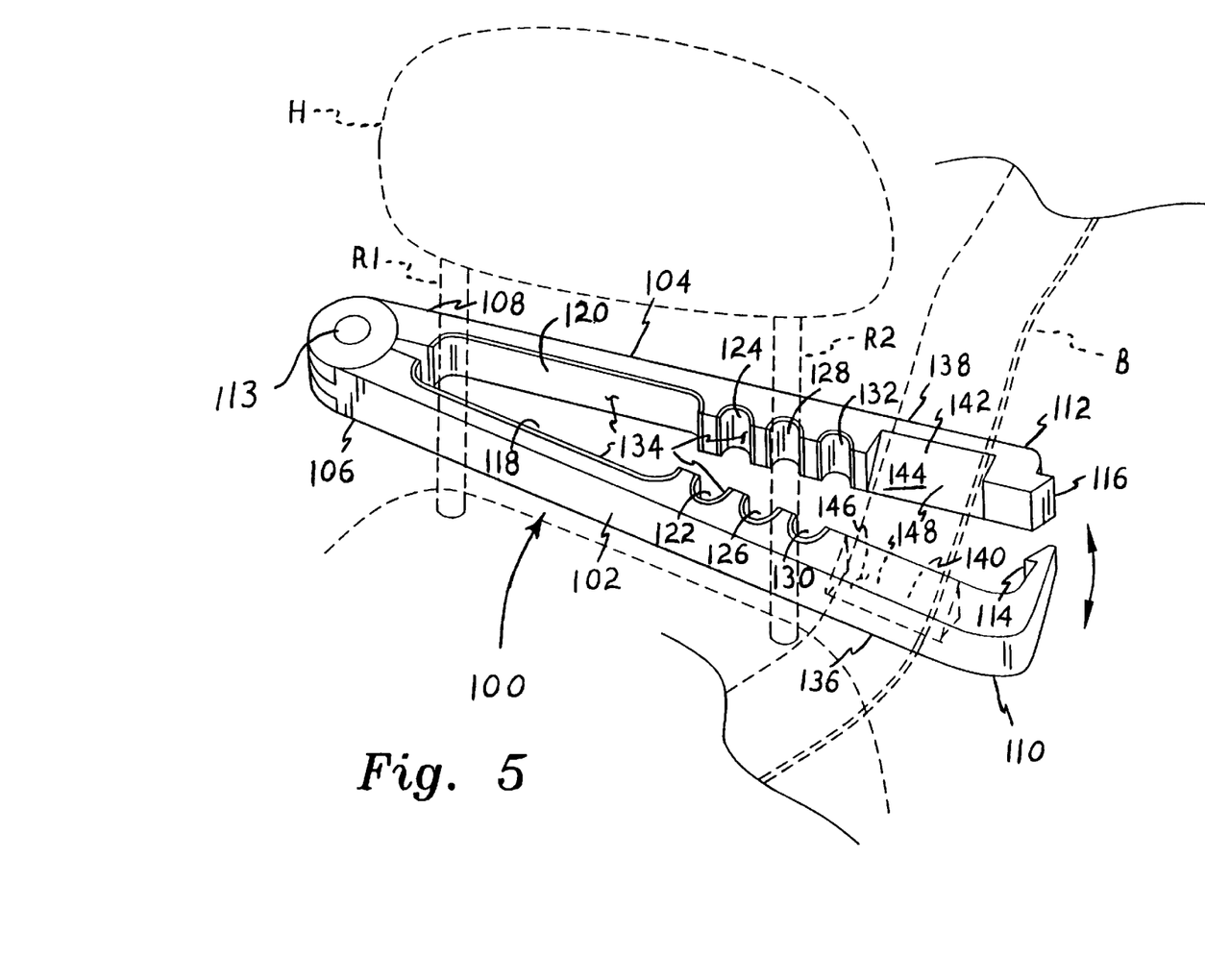
FIG. 5 is an environmental perspective view of the second embodiment of the present invention, comprising an elongate clamp with a shoulder harness slot for securing about the supports for an adjustable headrest, for positioning the shoulder harness.

FIGS. 4 and 5 illustrate a second embodiment of the present restraint belt positioning system, comprising an elongate headrest attachment bar 100 which secures removably to the two headrest support rods R1 and R2 conventionally found in vehicles having height adjustable headrests H. The headrest attachment bar 100 serves as a guide for the shoulder harness strap or belt B, allowing the user of the bar 100 to reposition the upper portion of the belt B as desired for greater occupant comfort.

The bar 100 comprises opposite first and second arms, respectively 102 and 104, each having a first end, respectively 106 and 108, and an opposite second end, respectively 110 and 112. The first ends 106 and 108 are secured together by a hinge 113, allowing the two arms 102 and 104 to be spread angularly for removably installing about the two headrest supports R1 and R2. The second ends 110 and 112 include clasp means enabling the two ends 110, 112 to be secured together to lock the bar around the two headrest support rods R1 and R2 as desired. The clasp means may take any one of a number of different forms, e.g., a catch 114 extending inwardly from the second end 110 of the first arm 102, and a cooperating lip 116 extending outwardly from the second end 112 of the second arm 104. Preferably, at least the clasp components are formed of a flexible material, allowing the catch 114 to be flexibly engaged with the lip 116 to lock the two arms 102 and 104 together as desired, and further allowing the catch 114 to be pulled away from the lip 116 to open the two arms 102 and 104 as required.

Each of the arms 102 and 104 includes at least two headrest support slots formed therein, with corresponding slots facing one another on the inner faces of the arms and in registry with one another for forming headrest support passages when the arms 102 and 104 are closed about the two headrest support rods R1 and R2. The slots may be of any of a number of different configurations, so long as their shape and spacing provides for securing the bar assembly 100 about the two headrest supports R1 and R2. As such headrest supports R1 and R2 may be of variable spacing, depending upon the vehicle model, preferably at least two facing headrest support slots 118 and 120 are formed as elongate, ovoid slots to secure about one of the headrest supports R1 with at least two other semicircular slots 122 and 124 securing about the opposite headrest support R2 to allow lateral adjustment of the closed bar assembly 100 for different headrest support spacing.

Further positional adjustment for the bar 100 may be provided by forming additional headrest support slots therein, e.g., an intermediate semicircular slot set comprising cooperating slots 126 and 128, and/or an outermost semicircular slot set comprising cooperating slots 130 and 132. Each of these channels or slots 118 through 132 preferably has a lining 134 of a resilient material having a high coefficient of friction, in order to provide a positive grip for the bar 100 upon the headrest support rods R1 and R2 and preclude slippage when the bar 100 is installed thereon.

By providing a series of different slot pairs 122, 124; 126, 128; and 130, 132 (or more) along the two arms 102, 104, the bar 100 may be secured to the two headrest support rods R1 and R2 to adjust the position of the distal end of the bar with its clasp components 114, 116, laterally as desired. This allows the lateral positioning of the shoulder belt B to be adjusted as desired, as described below.

A shoulder belt holder extension, respectively 136 and 138, is provided between the outermost headrest support slots 130 and 132 and the clasp elements 114 and 116 of each arm 102 and 104. These extensions 136 and 138 extend outwardly, i.e., generally toward the adjacent door or "B" pillar of the car, and cooperate to serve as a guide for the shoulder harness belt B, generally as shown in FIG. 5 of the drawings. These two extensions 136 and 138 each have a generally triangular slot, respectively 140 and 142, formed therein, with the two slots 140 and 142 facing one another and in registry with one another and having generally diagonally sloping walls, respectively 144 and 146, to form a restraint strap passage 148 therebetween through the extensions 136 and 138 when the two arms 102 and 104 are closed. This allows the shoulder belt B to descend from its relatively high mounted guide G, downwardly to pass over the shoulder and upper body of the occupant, and to pass smoothly through the restraint strap passage 148.

The shoulder restraint adjuster bar 100 thus allows an occupant of a vehicle equipped with a shoulder restraint belt B, to adjust the position of the belt B both vertically (by means of the vertical positioning of the bar 100 on the headrest support rods R1 and R2) and laterally (by means of the lateral positioning of the bar 100 on the headrest support rods, by means of the plurality of elongated channels and slots 118 through 132 formed in each facing side of the arms 102 and 104). The orientation of the restraint strap passage 148 allows the restraint belt B to pass smoothly therethrough, without binding or pinching therein, to allow the occupant to adjust the shoulder belt B comfortably as desired without need to open the two arms 102, 104 of the bar 100 to allow the belt B to move.

In conclusion, the present positioning devices for vehicle passenger restraints provide considerably increased comfort for the occupant(s) of a vehicle equipped with conventional restraint belts and straps, particularly for those occupants who vary somewhat from the 50th percentile size around which the standards for such restraints are set. The belt clamp 100 provides increased comfort for vehicle occupants by providing a certain amount of slack in the belt, as set by the occupant. It will be seen that while this device is illustrated in FIG. 1 of the drawings with a shoulder restraint belt or strap, that the belt clamp 100 may also be used to provide slack as desired in a lap belt if so desired, in lieu of or in addition to the use of such a device with the shoulder restraining belt or strap.

The headrest attachment bar 100 does not restrict the extension or retraction of the conventional shoulder harness strap or belt in any way, but rather serves to reposition the upper portion of the shoulder belt either vertically or laterally as it extends from the upper guide. This vertical and lateral adjustment of the upper portion of the shoulder restraint, enables the vehicle occupant(s) to adjust the position of the shoulder restraint in two dimensions as desired, for optimum comfort while traveling.

It will be seen that the two embodiments of the present invention may also be used together, if so desired. FIG. 4 illustrates this configuration, with the shoulder harness guide bar 100 installed on the headrest support rods R1 and R2 of the vehicle seat and guiding the shoulder harness belt B as desired, with the belt clamp 100 being secured about the belt or strap B to bear against the front of the guide arm extension portions 136 and 138 of the arms 102 and 104 to preclude excessive retraction of the strap through the guide passage 148 of the installed bar 100. Regardless of their specific installation, it will be seen that the present strap clamp 10 and shoulder strap guide bar 100 serve to provide considerably increased comfort for occupants of vehicles equipped with conventional shoulder and lap restraint belts, whether the embodiments are used together or independently of one another.

It is to be understood that the present invention is not limited to the embodiments described above, but encompasses any and all embodiments within the scope of the following claims.

I claim:

1. A positioning device for an occupant restraint strap in a vehicle, wherein the restraint strap passes through a guide, the positioning device comprising:
    a housing comprising a first side and a second side opposite said first side, for selectively securing around the restraint strap and positioning adjacent the guide;
    a first edge and a second edge opposite said first edge, formed along each said side;
    hinge means disposed along each said first edge, interconnecting said first side and said second side together;
    mutually cooperating clasp means disposed along each said second edge, for selectively closing each said side together about the restraint strap;
    said first side and said second side each further having an inner surface defining a restraint strap passage therebetween, when said first side and said second side are closed together;
    a lateral slope formed upon said inner surface of said first side;
    said slope having a first end and a second end opposite said first end, with said first end of said slope being closer to said inner surface of said second side than said second end of said slope when said first side and said second side are closed together;
    a restraint belt gripping plate adjacent said inner surface of said first side;
    a laterally disposed slot formed through said first side, extending generally from said first end to said second end of said slope of said inner surface of said first side;
    a slide control installed within said slot; and
    a plate contact bearing extending from said slide control adjacent said inner surface of said first side, for selectively urging said gripping plate toward said inner surface of said second side for gripping the restraint belt between said first side and said second side and locking said housing immovably to said restraint belt when said slide control is slid toward said first end of said slope.

2. The positioning device according to claim 1, wherein said clasp means comprises:
    a depending, inwardly turned extension from said second edge of said first side; and
    an outwardly extending lip from said second edge of said second side, said extension of said second edge of said first side selectively gripping said lip of said second edge of said second side for selectively securing each said second edge together as desired.

3. The positioning device according to claim 1, including a strap contact surface having a high coefficient of friction disposed upon said restraint belt gripping plate.

4. The positioning device according to claim 1, wherein first end of said slope is adjacent said hinge of said first side and said second side, and wherein said second end of said slope is adjacent said clasp means of said first side and said second side, for releasing pressure on the restraining strap passing through said housing by sliding said slide control toward said clasp means of said housing.

5. The positioning device according to claim 1, wherein said housing has a substantially square shape with rounded edges and corners.

6. A positioning device for an occupant restraint strap in a vehicle, wherein the vehicle includes at least one occupant seat having a headrest supported by two spaced apart headrest supports, the positioning device comprising:
    an elongate headrest support attachment bar comprising a first arm and a second arm opposite said first arm, for selectively securing around the headrest supports;
    each said arm further having a first end and a second end opposite said first end;
    hinge means disposed at said first end of each said arm, interconnecting said first arm and said second arm together;
    mutually cooperating clasp means disposed at said second end of each said arm, for selectively closing each said arm together;
    at least two headrest support slots formed in each said arm, with said headrest support slots facing and in registry with one another and defining corresponding headrest support passages when each said arm is closed together;

an extension disposed between said headrest support slots and said clasp means of each said arm; and a restraint strap slot formed in each said extension, with each said restraint strap slot facing and in registry with one another and defining a restraint strap passage when each said arm is closed together, for selectively positioning and guiding the restraint strap as desired relative to the occupant seat and headrest of the vehicle.

7. The positioning device according to claim 6, wherein said headrest support slots of each said arm comprise a first elongate, ovoid slot and at least one second semicircular slot.

8. The positioning device according to claim 7, wherein said at least one second slot comprises a plurality of second slots.

9. The positioning device according to claim 6, wherein each of said headrest support slots is lined with a resilient material having a high coefficient of friction, for positively gripping the headrest supports of the occupant seat and precluding slippage of said bar relative to the occupant seat when said bar is secured to the headrest supports.

10. The positioning device according to claim 6, wherein each said restraint strap slot has a generally triangular cross section defining a generally diagonal restraint strap passage through said extension when each said arm is closed together.

11. A positioning apparatus for an occupant restraint strap in a vehicle, wherein the restraint strap passes through a guide and the vehicle includes at least one occupant seat having a headrest supported by two spaced apart headrest supports, the positioning apparatus comprising:

a housing comprising a first side and a second side opposite said first side, for selectively securing around the restraint strap and positioning adjacent the guide;

a first edge and a second edge opposite said first edge, formed along each said side of said housing;

hinge means disposed along each said first edge of each said side of said housing, interconnecting said first side and said second side of said housing together;

mutually cooperating clasp means disposed along each said second edge of each said side of said housing, for selectively closing each said side of said housing together about the restraint strap;

said first side and said second side of said housing each further having an inner surface defining a restraint strap passage therebetween, when said first side and said second side of said housing are closed together;

a lateral slope formed upon said inner surface of said first side of said housing;

said slope having a first end and a second end opposite said first end, with said first end of said slope being closer to said inner surface of said second side of said housing than said second end of said slope when said first side and said second side of said housing are closed together;

a restraint belt gripping plate adjacent said inner surface of said first side of said housing;

a laterally disposed slot formed through said first side of said housing, extending generally from said first end to said second end of slope of said inner surface of said first side of said housing;

a slide control installed within said slot;

a plate contact bearing extending from said slide control adjacent said inner surface of said first side of said housing, for selectively urging said gripping plate toward said inner surface of said second side of said housing for gripping the restraint belt between said first side and said second side of said housing and locking said housing immovably to said restraint belt when said slide control is slid toward said first end of said slope;

an elongate headrest support attachment bar comprising a first arm and a second arm opposite said first arm, for selectively securing around the headrest supports;

each said arm of said bar further having a first end and a second end opposite said first end;

hinge means disposed at said first end of each said arm of said bar, interconnecting said first arm and said second arm of said bar together;

mutually cooperating clasp means disposed at said second end of each said arm of said bar, for selectively closing each said arm of said bar together;

at least two headrest support slots formed in each said arm of said bar, with said headrest support slots facing and in registry with one another and defining corresponding headrest support passages when each said arm of said bar is closed together;

an extension disposed between said headrest support slots and said clasp means of each said arm of said bar;

a restraint strap slot formed in each said extension, with each said restraint strap slot facing and in registry with one another and defining a restraint strap passage when each said arm of said bar is closed together, for selectively positioning and guiding the restraint strap as desired relative to the occupant seat and headrest of the vehicle; and said bar comprising a housing stop for precluding excessive retraction of the restraint strap when said housing is secured to the restraint strap and contacts said bar when said bar is secured to the headrest supports of the vehicle occupant seat and the restraint stop is installed within said restraint strap passage of said bar.

12. The positioning apparatus according to claim 11, wherein said clasp means of said housing comprises:

a depending, inwardly turned extension from said second edge of said first side of said housing; and an outwardly extending lip from said second edge of said second side of said housing, said extension of said second edge of said first side of said housing selectively gripping said lip of said second edge of said second side of said housing for selectively securing each said second edge of said housing together as desired.

13. The positioning apparatus according to claim 11, including a strap contact surface having a high coefficient of friction disposed upon said restraint belt gripping plate of said first side of said housing.

14. The positioning apparatus according to claim 11, wherein first end of said slope is adjacent said hinge of said first side and said second side of said housing, and wherein said second end of said slope is adjacent said clasp means of said first side and said second side of said housing, for releasing pressure on the restraining strap passing through said housing by sliding said slide control toward said clasp means of said housing.

15. The positioning apparatus according to claim 11, wherein said housing has a substantially square shape with rounded edges and corners.

16. The positioning apparatus according to claim 11, wherein said headrest support slots of each said arm of said bar comprise a first elongate, ovoid slot and at least one second semicircular slot.

17. The positioning apparatus according to claim 16, wherein said at least one second slot of each said arm of said bar comprises a plurality of second slots.

18. The positioning apparatus according to claim 11, wherein each of said headrest support slots of each said arm of said bar is lined with a resilient material having a high coefficient of friction, for positively gripping the headrest supports of the occupant seat and precluding slippage of said bar relative to the occupant seat when said bar is secured to the headrest supports.

19. The positioning apparatus according to claim 11, wherein said restraint strap slot of each said arm of said bar has a generally triangular cross section defining a generally diagonal restraint strap passage through said extension when each said arm of said bar is closed together.

* * * * *